May 12, 1953         C. C. CURTIS         2,638,527
MASSAGE AND HEAT APPLICATOR
Filed June 8, 1948
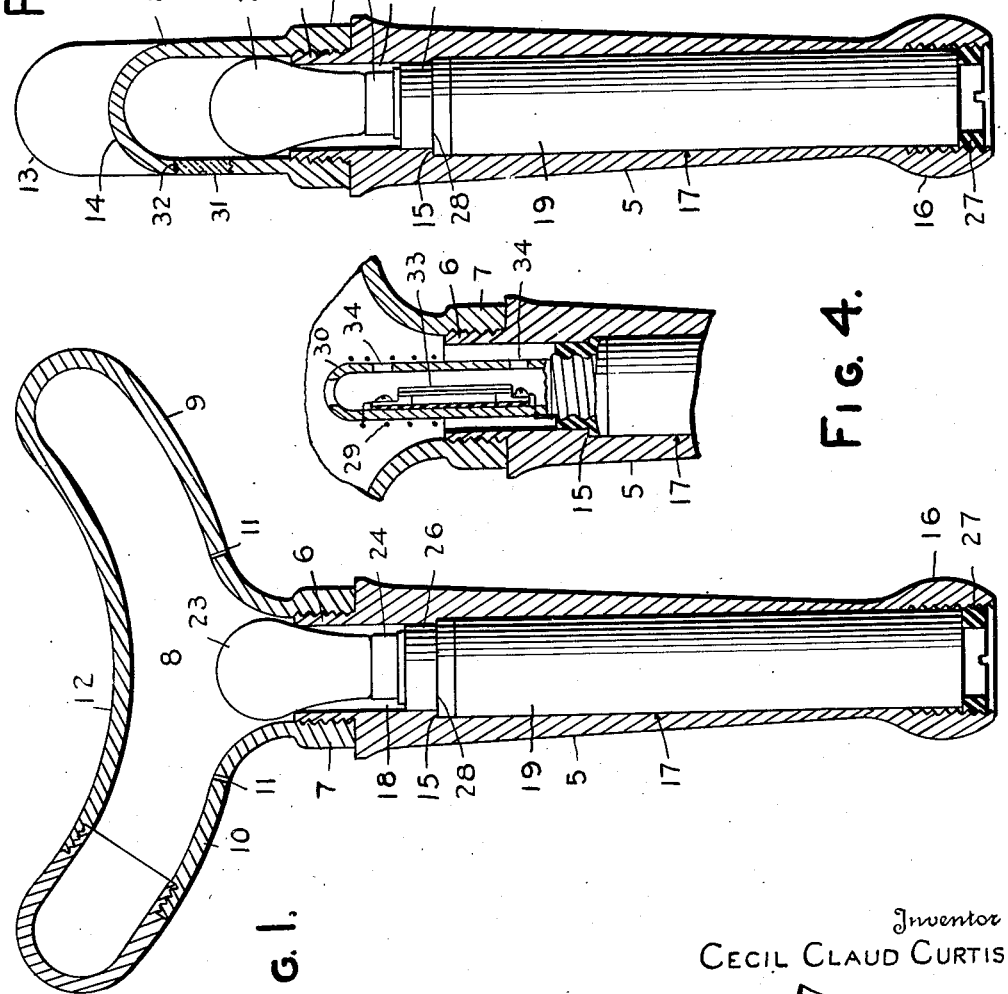
Inventor
CECIL CLAUD CURTIS Patented May 12, 1953

2,638,527

UNITED STATES PATENT OFFICE 2,638,527

MASSAGE AND HEAT APPLICATOR

Cecil Claud Curtis, Washington, D. C.

Application June 8, 1948, Serial No. 31,673

3 Claims. (Cl. 219—21)

In a co-pending application Serial Number 31,674, executed of even date herewith, an applicator for massage accompanied by heat or cold treatment of portions of the human body, is disclosed and illustrated. With the device referred to it is intended that a cooling medium or a heating medium may alternatively be employed at the option of the operator.

As distinguished from the broader or more comprehensive spirit of the invention claimed in the companion case, the instant invention has for its primary object the provision of a device of the general character referred to, primarily devoted or restricted to a heating phase of the implement.

The characteristic feature of the present invention is a simple inexpensive and efficient means constituting a heating unit confined within a tubular handle portion or grip of the implement, having open communication with the hollow head thereof, and replaceable for purposes of substitution or repair for imparting the desired heat to the head or treating portion of the implement.

The invention further comprises means for automatically controlling the heat or thermal operating condition of the implement where it may be desired to obviate reliance solely on the operator or patient so that, under any conditions, there will be a limit to the heating of the implement or applicator; and an ancillary feature of the heat control means being that the same constitutes a portion of the removable heating unit that may be readily withdrawn or inserted into the implement.

Still another characteristic of the implement is a visible means formed with the portion of the implement enclosing a heating light bulb or an equivalent heating resistance coil, through which the glow or illumination of the bulb or coil may be apparent to the operator to assure the operator that the implement is in proper working condition.

The preferred embodiment of the invention, with one modified embodiment thereof, are illustrated in the accompanying drawings forming part hereof and the same will be readily understood from an inspection of said drawings together with the specific description thereof hereinafter contained.

In the drawings:

Figure 1 is a longitudinal central section of the implement containing the removable heating unit.

Figure 2 is a similar longitudinal section on a line at right angles to that of Figure 1.

Figure 3 is a longitudinal sectional view of the removable heating unit detached from the implement.

Figure 4 is a fragmentary sectional view of the implement provided with a combined heating coil and thermostat in lieu of the heating lamp element of the other figures.

Referring more specifically to the drawings wherein like reference characters designate corresponding parts in the several views 5 designates the tubular or hollow handle or grip portion of the implement by which the same may be manipulated with respect to the ailing part to be treated, the same having a threaded extension 6 adapted to receive the complementary collar 7 of the hollow head 8, the interior of which opens to the hollow handle or grip. The grip 5 and head 8 are formed of metal such as steel or aluminum and the head 8 has the laterally extended branches 9 and 10 provided with small escape apertures 11 to facilitate circulation of air through the hollow head.

The branches 9 and 10 of the head are curved to have the configuration shown in Figures 1 and 2, so that the operating or contact face 12 thereof is concaved toward the handle 5 in order to combine with the curvature generally present in a portion of the body to be treated, for examples, the neck, face, arms or legs, etc. To avoid any harsh contact or impediment to the manipulation of the implement over the skin of the patient, the head 8 throughout its extent is rounded transversely at the ends thereof to eliminate corners or edges, as apparent from Figure 2, 13 denoting the curvature of the outer surface of the arms and 14 the surface of the intermediate or connecting portion of the said arms.

On the interior of the grip or handle 5 there is a shoulder 15 facing that end 16 of the grip opposite to the headed end thereof. The opening 17 through the grip or handle being of slightly greater and uniform diameter leading to said shoulder than that portion of the opening 18 of uniform, but slightly reduced diameter, constitutes a receiving chamber for the reception of a heating element or unit now to be defined. Said unit comprises a cylinder 19 of insulating material, with insulated wire terminal supporting means 20 inserted in one end (Figure 3), the insulated wiring being shown at 21 and 22, leading to an ordinary or preferred incandescent lamp 23, the latter having the customary stem 24 screwed into a metal thimble 25, carried by an insulated cap 26 at the end of the cylinder 19. The near ends of the wires 21 and 22 are in the customary electrical communication with the filament of the lamp or bulb 23 as at exposed or uninsulated portions 21a and 22a of the otherwise insulated wires 21 and 22.

In inserting this unit just described in the grip or handle 5, the lamp bulb 23 may be removed and the balance of the unit intact inserted through the bottom of the handle when the lamp bulb 23 may be restored to the unit, the head 8 being removed temporarily for that purpose. Of course, when the bulb is relatively smaller than that illustrated, the same may be attached to the unit before it is inserted in the grip or handle. When the heating unit is seated in the handle the same is held in place by a clamping ring 27 having threaded engagement with the end 16 of the grip or handle, which will effect a seating of the flange 28 for the unit against the shoulder 15 of the handle or grip 5.

In lieu of the light bulb 23, it may at times be preferable or convenient to employ the resistance coil 29, illustrated in Figure 4, the operation of which is well understood in the art, the same being a resistance wire introduced in the electrical circuit and wound or supported upon a core of suitable substance, such as porcelain 30. To enable the operator to know that the implement is in heating state, a small disc of transparent plastic material 31 is screwed into one side wall of the head, as at 32, and by this means the illumination of the bulb 23 or glow from the coil 29 may be seen.

At times it may be desirable to have a thermostat associated with the heating unit to prevent extreme heat imparted by the lamp or coil to the threaded head 8 or to constantly maintain a given thermal temperature of the head. To these ends the thermostat 33 (Figure 3) is provided.

In the instance of the device of Figure 4, the porcelain core 30, on which the resistance wire 29 is coiled, is hollow and the thermostat 33 is carried on the interior thereof, circulating openings 34 being formed for air passage through the hollow core or shell.

I claim:

1. In a massage and heat applicator, a hollow arcuate head portion, an elongate tubular hand grip joined at one end to the center of the convex side of the head portion and opening into the same, a cylinder of insulation material of approximately the same length as and fitting snugly in the hand grip, an electric heating element supported in the joined end of the cylinder and projecting into the head portion, a wire terminal supporting means secured in the other end of the cylinder, electric current conductors extending through the cylinder from said terminal means to said heating element, said cylinder being insertible into and removable from the hand grip through the end thereof opposite from the head portion, and an annular retaining element secured in the last mentioned end of the hand grip.

2. The invention as set forth in claim 1, with engaging opposed shoulders between the joined end of the cylinder and the wall of the hand grip limiting the extent of movement of the cylinder inwardly of the hand grip and thereby fix the operative relation of said heating element with respect to the interior of the head.

3. In a massage and heat applicator, an elongated arcuate hollow head portion, an elongate tubular hand grip joined at one end to the center of the convex side of the head portion and opening into the same, a cylinder of insulation material extending through the major portion of the length of the hand grip, a cylindrical cap of insulation material on the end of the cylinder adjacent to said head portion, the cap having an axial bore and a portion of external diameter smaller than the outside diameter of the cylinder forming a shoulder, the hand grip having an internal shoulder engaged by said cap shoulder, a threaded metal thimble within the cap, an electric heating element threaded into said thimble and projecting into the head portion, a wire terminal supporting means secured in the other end of the cylinder, electric current conductors extending through the cylinder and electrically connecting with the heating element, said cylinder being insertible into and removable from the hand grip through the end thereof opposite from the head portion, and means removably secured in the last mentioned end of the hand grip for retaining the cylinder in position therein.

CECIL CLAUD CURTIS.

References Cited in the file of this patent

UNITED STATES PATENTS

| Number | Name | Date |
|---|---|---|
| 1,052,097 | Schwartz | Feb. 4, 1913 |
| 1,433,286 | Kannenstine | Oct. 24, 1922 |
| 1,628,272 | Reitz | May 10, 1927 |
| 1,663,078 | Harper | Mar. 20, 1928 |
| 1,690,926 | Dequer | Nov. 6, 1928 |
| 1,782,005 | Grison | Nov. 18, 1930 |
| 1,820,799 | Hazlett et al. | Aug. 25, 1931 |
| 1,970,642 | Batchelder | Aug. 21, 1934 |
| 2,021,732 | Lipsner | Nov. 19, 1935 |
| 2,183,726 | Sommer et al. | Dec. 19, 1939 |
| 2,201,703 | Sage | May 21, 1940 |
| 2,214,084 | Lovice | Sept. 10, 1940 |
| 2,432,106 | Wesely | Dec. 9, 1947 |
| 2,456,030 | Sohns | Dec. 14, 1948 |